United States Patent [19]

Zecher et al.

[11] Patent Number: 5,093,457

[45] Date of Patent: Mar. 3, 1992

[54] PRODUCTION OF POLYAMIDE IMIDES

[75] Inventors: Wilfried Zecher, Leverkusen; Rolf Dhein, Krefeld; Aziz El-Sayed, Leverkusen; Wilfried Haese, Moenchengladbach, all of Fed. Rep. of Germany

[73] Assignee: Bayer Aktiengesellschaft, Leverkusen-Bayerwerk, Fed. Rep. of Germany

[21] Appl. No.: 395,986

[22] Filed: Aug. 21, 1989

[30] Foreign Application Priority Data

Sep. 3, 1988 [DE] Fed. Rep. of Germany ....... 3829959

[51] Int. Cl.$^5$ .................. C08G 18/38; C08G 73/14; C08J 9/08
[52] U.S. Cl. ........................... 528/73; 528/45; 528/68; 528/85; 521/48; 521/107; 521/108; 521/129; 521/157; 524/108
[58] Field of Search ............ 528/73, 903, 85, 45, 528/68; 521/157, 129, 48, 107, 108, 129, 157; 524/108

[56] References Cited

U.S. PATENT DOCUMENTS

| | | | |
|---|---|---|---|
| 4,604,409 | 8/1986 | Gacsiani et al. | 521/157 |
| 4,640,970 | 2/1987 | Zecher et al. | 528/73 |
| 4,728,697 | 3/1988 | Bolon et al. | 528/73 |
| 4,816,544 | 3/1989 | Komiya et al. | 528/73 |
| 4,829,140 | 5/1989 | Zecher et al. | 528/73 |
| 5,004,795 | 4/1991 | Zecher et al. | 528/73 |

*Primary Examiner*—John Kight, III
*Assistant Examiner*—Duc Truong
*Attorney, Agent, or Firm*—Connolly & Hutz

[57] ABSTRACT

The invention relates to a process for the production of polyamide imides from diimidodicarboxylic acids, trimellitic imidocarboxylic acids and diisocyanates and to their use as moldings, films and binders for paints.

11 Claims, No Drawings

PRODUCTION OF POLYAMIDE IMIDES

This invention relates to a process for the production of polyamide imides from diimide dicarboxylic acids, trimellitic imidocarboxylic acids and diisocyanates and to their use as moldings, films and binders for paints.

It is known that aliphatic-aromatic polyamide imides can be prepared by reaction of polyisocyanates with cyclic polycarboxylic anhydrides and lactams (DE-AS 17 70 202) or polyamides (DE-AS 19 56 512). These polyamide imides have special properties, such as high softening temperatures and good elasticity values, and may be used as high-temperature-resistant coatings, for example in the field of electrical insulating varnishes, or as thermoplastics. It is also known that aliphatic-aromatic polyamide imides can be obtained by condensation of polyisocyanates with trimellitic imidocarboxylic acids (Makromol. Chem. 183, 557 and 571, 1982).

The production of polyamide imides from diimide dicarboxylic acids and diisocyanates is described in DE-AS 17 20 909 and 24 41 020. According to JP-OS 56 136 813, polymers used as paint binders are obtained from trimellitic imidocarboxylic acids, polycarboxylic anhydrides, trisfunctional isocyanatoisocyanurates and diisocyanates.

It has now been found that polyamide imides having excellent properties are obtained when aliphatic, aliphatic-aromatic or aromatic diisocyanates are reacted with 5 to 95 mol-%, based on the sum of the dicarboxylic acids, of trimellitic imidocarboxylic acids corresponding to formula (I)

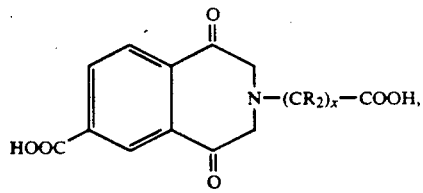

in which
the R's independently of one another represent hydrogen (H), $C_{1-6}$ alkyl,
x is the number 1, 2, 3, 4, 5, 6, 7, 8, 9, 10, 11 or 12, and 95 to 5 mol-%, based on the sum of the carboxylic acids, of diimide dicarboxylic acids corresponding to formula (II)

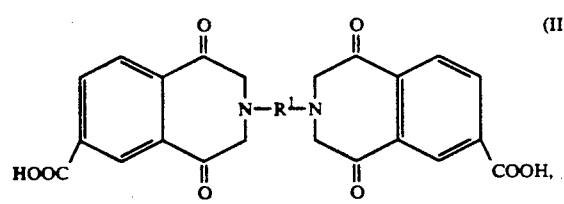

in which
$R_1$ is an aliphatic, aliphatic-aromatic or aromatic radical, optionally in a solvent and optionally in the presence of a catalyst at temperatures in the range from 50° to 400° C. and preferably at temperatures in the range from 70° to 350° C.

Instead of the diimidodicarboxylic acids, it is also possible to use stoichiometric quantities of diisocyanates and trimellitic anhydride.

The polyamide imides according to the invention are distinguished by good mechanical properties, such as high heat resistance, toughness and good flow behavior during processing. These properties may be regarded as surprising because, according to the literature, the reaction of trimellitic imidocarboxylic acids with diisocyanates is accompanied to a considerable extent by secondary and crosslinking reactions (Makromol. Chem. 183, 557 and 571, 1982). The reaction of diimidodicarboxylic acids gives reaction products which can only be processed by powder press-molding techniques (DE-AS 24 41 020). Reaction products according to JP-OS 56 136 813 lead to highly crosslinked polyamide imide systems which cannot be used as thermoplastics.

The trimellitic imidocarboxylic acids which may be used for the reaction according to the invention are obtainable, for example, from trimellitic anhydride and the lactams or aminocarboxylic acids by known processes. They may be prepared separately or "in situ" by heating of trimellitic anhydride with a lactam and subsequent addition of the other components. The trimellitic imidocaproic acids correspond to formula (I)

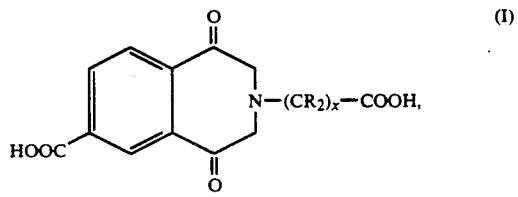

in which
the R's independently of one another represent hydrogen (H), $C_{1-6}$ alkyl,
x is the number 1, 2, 3, 4, 5, 6, 7, 8, 9, 10, 11, 12, preferably the number 3, 5, 10 or 11.

Trimellitic imidocaproic acid (x=5), in the form of ω-trimellitic imidocaproic acid, is particularly preferred.

The diimidodicarboxylic acids according to the invention are prepared by known methods, for example by the condensation of corresponding diamines or diisocyanates with trimellitic anhydride, either separately or "in situ".

Diimidodicarboxylic acids according to the invention are, for example, compounds corresponding to formula (II)

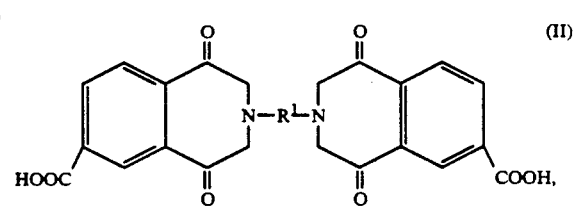

in which
$R^1$ is a $C_{1-20}$ aliphatic radical optionally substituted by halogen (for example Fl, Cl, Br), alkyl and/or aryl groups, a $C_{5-12}$ aromatic radical, a $C_{5-13}$ cycloaliphatic radical, a $C_{6-20}$ aliphatic-aromatic radical and a cyclic radical containing up to three heteroatoms, such as N, O or S, which may be aromatic or aliphatic and has 5 to 12 ring atoms.

Preferred radicals $R^1$ in formula (II) are $C_{2-12}$ aliphatic radicals, such as hexamethylene, trimethyl hexamethylene, radicals derived from isophorone, $C_{6-15}$ cycloaliphatic radicals, such as biscyclohexyl methylene, arylene radicals, such as phenylene, tolylene and radicals derived from diphenyl methane and diphenyl ethers. The radicals of 4,4'- and 2,4'-diphenyl methane, 2,4- and 2,6-toluene and mixtures thereof are particularly preferred.

In another embodiment, diamines corresponding to formula (III) or diisocyanates corresponding to formula (IV)

$$H_2N\text{—}R^1\text{—}NH_2 \qquad (III)$$

and $$OCN\text{—}R^1\text{—}NCO \qquad (IV)$$

in which $R^1$ is as defined for formula (I) may be used together with the stoichiometric quantity of trimellitic anhydride instead of the diimidodicarboxylic acids for the reaction according to the invention.

The condensation reaction to the diimidodicarboxylic acids may be carried out at the same time as the other reaction, particularly where the diisocyanates are used. In one preferred embodiment, the diamines (III) or diisocyanates (IV) are first reacted with trimellitic anhydride, followed by the further reaction.

Diisocyanates of the type described, for example, in German patent application 32 04 129.2 may be used as isocyanates for the reaction according to the invention. Preferred diisocyanates correspond to formula (V)

$$R^2\text{—}(\text{—}NCO)_2 \qquad (V)$$

in which $R^2$ is a $C_{1-20}$ aliphatic radical optionally substituted by halogen, alkyl and/or aryl groups, a $C_{5-12}$ aromatic radical, a $C_{5-13}$ cycloaliphatic radical, a $C_{6-20}$ aliphatic-aromatic radical and a cyclic radical containing up to three heteroatoms, such as N, O or S, which may be aromatic or aliphatic and has from 5 to 12 ring atoms.

Particularly preferred radicals in formula (V) are $C_2$-$C_{12}$ aliphatic radicals, aryl radicals, such as phenylene, tolylene, radicals derived from diphenyl methane, diphenyl ether.

It is preferred to use mixtures of 2,4- and 2,6-tolylene diisocyanates readily obtainable on an industrial scale, m-phenylene diisocyanate and phosgenated condensates of aniline and formaldehyde having a polyphenylene-methylene structure and symmetrical compounds, such as 4,4'-diisocyanatodiphenyl methane, 4,4'-diisocyanatodiphenyl ether, naphthylene-1,5-diisocyanate, p-phenylene diisocyanate, 4,4'-diisocyanatodiphenyl dimethyl methane, corresponding hydroaromatic diisocyanates, such as 4,4'-diisocyanatodicyclohexyl methane and aliphatic diisocyanates containing 2 to 12 carbon atoms, such as hexamethylene diisocyanate, trimethyl hexamethylene diisocyanate, diisocyanates derived from isophorone, etc.

4,4'- and 2,4'-diisocyanatodiphenyl methane, 2,4-and 2,6-tolylene diisocyanate, industrial mixtures of 2,4- and 2,6-tolylene diisocyanate and mixtures thereof are particularly preferred.

Instead of the isocyanates, it is also possible to use compounds which react as isocyanates under the reaction conditions, preferably the addition compounds of alcohols, phenols and lactams, for example of phenol, technical cresol mixtures and caprolactam, pyrrolidone or of mixtures of the amines corresponding to the isocyanates and aliphatic and aromatic carbonic acid esters, for example carbonic acid diethyl ester, carbonic acid diphenyl ester and ethylene carbonate, which may even have been partly reacted with one another, or even for example the polycarbodiimides of the described polyisocyanates, etc.

Monofunctional isocyanates such as, for example, phenyl isocyanate, tolyl isocyanate, cyclohexyl isocyanate, stearyl isocyanate, $\beta,\beta,\beta$-trifluoroethyl isocyanate and 3,5-bis-trifluoromethyl phenyl isocyanate, or the corresponding amines may also be used to regulate molecular weight.

In addition, carboxylic acids which react monofunctionally under the reaction conditions, such as for example phthalic acid or phthalic anhydride, benzoic acid, palmitic acid and N-phenyl or N-dodecyl trimellitic imido acid, which may even be substituted by $C_{1-6}$ alkyl or halogen (for example fluorine, chlorine), may be used to regulate molecular weight.

The polyamide imides suitable for use in accordance with the invention may be prepared in solvents, as described in DE-AS 17 70 202. Preferred solvents are phenols, such as phenol, and technical mixtures of o-, m- and p-cresols; also lactams, such as caprolactam or N-methyl caprolactam, tetramethylene sulfone, acid amides, such as dimethyl acetamide and dimethyl formamide, and ureas, such as tetramethyl urea, N,N'-dimethyl ethylene and propylene urea, etc. The particularly preferred solvent is N-methyl pyrrolidone.

To prepare the polyamide imides suitable for use in accordance with the invention, the reaction components are kept for a few minutes to several hours at temperatures in the range from 70° to 350° C. in the presence or absence of a solvent. The course of the reaction may be followed, for example, from the evolution of gas, the increase in viscosity and the IR spectra.

In one preferred embodiment, the trimellitic imidocarboxylic acids and diimidodicarboxylic acids are initially introduced in a solvent, the diisocyanate is introduced in bulk or in solution over a period of 1 to 10 hours, preferably 2 to 6 hours, at temperatures in the range from 80° to 200° C. and preferably at temperatures in the range from 110° to 150° C. and the reaction is continued at temperatures in the range from 120° to 230° C.

A preferred variant of this embodiment comprises introducing 90 to 100%, preferably 95 to 99%, of the stoichiometric quantity of the diisocyanate in the course of 1 to 10 hours at temperatures of 80° to 200° C., preferably 110° to 150° C., continuing condensation at temperatures of 120° to 230° C., then introducing a further 1 to 12%, preferably 2 to 7%, of the stoichiometric quantity of the diisocyanate in portions at 80° to 200° C. and then completing the condensation at 120° to 230° C.

The reaction mixture can already be concentrated in the kettle to a melt which is still free-flowing and can then be condensed further. A preferred embodiment comprises carrying out the remaining concentration procedure, optionally with post-condensation, in an evaporating extruder, optionally in vacuo, at temperatures of 240° to 400° C., preferably 280° to 350° C. A further preferred embodiment comprises isolating the reaction product by precipitation or extraction and optionally completing condensation in an extruder or by means of solid-phase condensation.

The reaction can be carried out continuously and discontinuously.

Polyamide-imides with a relative viscosity, measured on a 1% solution in cresol at 25° C., of 1.5 to 3.0, preferably 1.7 to 2.6, mPas, have proven to be particularly suitable.

In general 1 val of isocyanate is used per val of carboxylic acid from the sum of the trimellitimidocarboxylic acids and diimido-dicarboxylic acids, although broad variations from these stoichiometric ratios are also possible. In some cases an excess of 0.5 to 6%, preferably of frequently 1 to 3% of isocyanate, per val of acid, and, where trimellitic anhydride is additionally used, per val of acid anhydride, has proven advantageous.

Where trimellitic anhydride is used instead of the diimidodicarboxylic acids or other dicarboxylic acids, 1 val isocyanate is used per val anhydride group and per val acid group. A preferred embodiment comprises first using one val of isocyanate per val of acid anhydride, respectively the components at temperatures of preferably 60° to 140° C. and then carrying out the further reaction under the stoichiometric and reaction conditions described. The quantity ratio of the imidocarboxylic acids according to the invention may be between 95 and 5 mol-% trimellitic imidocarboxylic acid (I) and between 5 and 95 mol-% diimidocarboxylic acid. In addition to the imidocarboxylic acids according to the invention, it is possible to use aliphatic dicarboxylic acids, such as adipic acid, azelaic acid, sebacic acid, aromatic dicarboxylic acids, such as preferably isophthalic acid, terephthalic acid, etc.

The production of the polymers according to the invention may also be influenced by catalysts, for example by basic catalysts, such as amines, for example triethylamine, dimethyl benzylamine, 1,4-diazabicyclo-(2,2,2)-octane, 2-methyl imidazole and pyridine, by inorganic and organic metal compounds, such as compounds of iron, lead, zinc, tin, copper, cobalt, nickel and titanium, for example cobalt acetate, lead oxide, dibutyl tin laurate, copper acetyl acetonate, nickel acetate, alkali phenolates and sodium cyanamide, by boron compounds, such boric acid, by phosphorus compounds, such as trialkyl phosphine, methyl phospholine oxide, triphenyl phosphite, triphenyl phosphate, polyphosphoric acid, etc.

The polyamide imides according to the invention may be used as binders for coatings. They may be processed to moldings and films by powder press-molding techniques and by injection molding and extrusion.

The polymers according to the invention are distinguished by particular tensile strength, E moduli and heat resistance. Their properties may be varied for the various fields of application, for example as thermoplastics, by changing the stoichiometric ratios, the degree of condensation and by addition of low molecular weight and high molecular weight components, such as fillers, pigments, antiagers, lubricants, plasticizers, for example phenols, such as dodecylphenol, and lactams, such as dodecane lactam, and other polymers.

EXAMPLE 1

218 g 4,4'-bis-trimellitic imidodiphenyl methane, 482 g trimellitic imidocaproic acid and 14.36 g N-dodecyl trimellitic acid imide are initially introduced into 1200 mg N-methyl pyrrolidone. A solution of 500 g 4,4'-diisocyanatodiphenyl methane in 360 g N-methyl pyrrolidone is then added dropwise over a period of 3 hours at 130° C. The condensation reaction is accompanied by elimination of carbon dioxide. The reaction mixture is then stirred for 1 hour at 130° C. and then for 2 hours at 150° C., for 2 hours at 170° C. and for 2 hours at 190° C. The polyamide imide is obtained in the form of a clear light brown solution in N-methyl pyrrolidone having a solids content of 40% by weight and a relative viscosity $\eta^{25}$ of 1.52, as measured on a 1% solution in N-methyl pyrrolidone. The IR spectrum shows the bands characteristic of imides at 1715 and 1785 cm$^{-1}$.

50 g of the polyamide imide solution thus prepared are concentrated by evaporation for 1 hour at 250° C. and 1 hour at 300° C. in a stream of nitrogen. The polyamide imide is obtained in the form of a fusible, clear and elastic resin having a relative viscosity $\eta^{25}$ of 1.95, as measured on a 1% solution in m-cresol at 25° C.

Another sample of the polyamide imide solution is precipitated in methanol. The polyamide imide is obtained in the form of a yellow, fibrous powder having a glass temperature Tg of 197° C. and a relative viscosity $\eta^{25}$ of 1.98, as measured in m-cresol.

EXAMPLE 2

25.0 g 4,4'-diisocyanatodiphenyl methane and 38.4 g trimellitic anhydride are stirred in 282 g N-methyl pyrrolidone for 4 hours at 80° C. and for 2 hours at 100° C. 120.2 g trimellitic amidocaproic acid and 4.31 g N-dodecyl trimellitic acid imide are then introduced and a solution of 126.5 g 4,4'-diisocyanatodiphenyl methane in 110 g N-methyl pyrrolidone is added dropwise over a period of 3 hours at 130° C. The reaction mixture is then stirred for 1 hour at 130° C. and then for 2 hours at 150° C., for 2 hours at 170° C. and for 2 hours at 190° C. The reaction product is a brown solution having a solids content of 40% by weight which is diluted with 95 g N-methyl pyrrolidone and precipitated in methanol. The polyamide imide is obtained in the form of a yellow powder having a glass temperature Tg of 189° C. and a relative viscosity $\eta^{25}$ of 1.54, as measured on a 1% solution in m-cresol.

A sample of the polyamide imide powder is dissolved in cresol, coated onto a glass plate and stoved for 15 minutes at 200° and 300° C. to form a clear elastic film.

EXAMPLE 3

491.4 g 4,4'-bis-trimellitic imidodiphenyl methane, 1084 g trimellitic imidocaproic acid and 32.2 g N-dodecyl trimellitic acid imide are initially introduced into 2465 g N-methyl pyrrolidone. 78.3 g of a technical mixture of 80% 2,4- and 20% 2,6-tolylene diisocyanate are then added dropwise at 130° C., followed by the dropwise addition over a period of 4 hours of 1001 g 4,4'-diisocyanatodiphenyl methane in 950 g N-methyl pyrrolidone. The reaction mixture is then stirred for 1 hour at 130° C., for 2 hours 150° C. and for 2 hours 170° C. After cooling to 130° C., 22.5 g 4,4'-diisocyanatodiphenyl methane in 50 g N-methyl pyrrolidone are added dropwise over a period of 1 hour. The reaction mixture is then stirred for 1 hour at 130° C., for 2 hours at 150° C., for 2 hours at 170° C. and for 2 hours at 190° C. The reaction product is a brown solution having a solids content of 40% by weight and a viscosity $\eta^{25}$ of 156,000 mPa.s.

A sample of the polyamide imide solution is concentrated by evaporation in a stream of nitrogen at 250° to 300° C. The polyamide imide is obtained in the form of a fusible, clear and elastic resin having a relative viscosity $\eta^{25}$ of 1.92, as measured on a 1% solution in m-cresol.

3% by weight, based on the solids content, of a technical mixture of p-dodecyl phenols are added to another sample of the polyamide imide solution, followed by concentration by evaporation in a stream of nitrogen at 250° to 300° C. The polyamide imide is obtained in the form of a fusible, elastic resin having a relative viscosity $\eta^{25}$ of 1.74, as measured on a 1% solution in m-cresol.

828 g N-methyl pyrrolidone are added to the remaining polyamide imide solution, followed by precipitation in methanol. The polyamide imide is obtained in the form of a fibrous yellow powder having a relative viscosity $\eta^{25}$ of 1.71, as measured on a 1% solution in m-cresol.

A sample of the polyamide imide powder is press-molded at 250° C./200 bar to form a clear, elastic disk. The glass temperature Tg is 199° C.

EXAMPLE 4

94.1 g trimellitic anhydride, 7.18 g N-dodecyl trimellitic acid imide, 112.5 g 4,4'-diisocyanatodiphenyl methane and 8.7 g of a technical mixture of 80% 2,4-and 20% 2,6-tolylene diisocyanate are introduced into 350 g N-methyl pyrrolidone, followed by stirring for 4 hours at 80° C., for 4 hours at 120° C. and then for 2 hours at 130° C., for 2 hours at 150° C. and for 2 hours 170° C. The condensation reaction is accompanied by elimination of carbon dioxide. The polyamide imide is obtained in the form of a clear brown solution having a solids content of 40% by weight and a relative viscosity $\eta^{25}$ of 1.55, as measured on a 15 solution in N-methyl pyrrolidone at 25° C. The IR spectrum shows bands characteristic of imides at 1715 and 1790 cm$^{-1}$.

A sample of the resin is coated onto a glass plate and stoved for 15 minutes at 200° C. and for 15 minutes at 300° C. to form a clear elastic paint film.

EXAMPLE 5

103.8 g trimellitic imidocaproic acid, 28.8 g trimellitic anhydride and 7.18 g N-dodecyl trimellitic acid imide are introduced into 220 g N-methyl pyrrolidone, followed by the dropwise addition over a period of 2 hours at 130° C. of a solution of 112.5 g 4,4'-diisocyanatodiphenyl methane and 8.4 g hexamethylene diisocyanate in 100 g N-methyl pyrrolidone. The reaction mixture is then stirred for 2 hours at 130° C., for 2 hours at 150° C., for 2 hours at 170° C. and for 2 hours at 190° C.

245 g solvent are then distilled off in vacuo, followed by stirring for 4 hours at 200° C. and then for another 4 hours at 220° C. The polyamide imide is obtained on cooling in the form of a clear brittle resin having a solids content of approximately 75% by weight and a relative viscosity $\eta^{25}$ of 1.50, as measured on a 1% solution in N-methyl pyrrolidone.

A sample of the resin is concentrated by evaporation in a stream of nitrogen at 250° and 300° C. The polyamide imide is obtained in the form of a fusible, clear resin having a relative viscosity $\eta^{25}$ of 1.90, as measured on a 1% solution in m-cresol.

EXAMPLE 6

125 g 4,4-diisocyanatodiphenyl methane in 90 g N-methyl pyrrolidone are added dropwise over a period of 2 hours at 130° C. to a solution of 47.0 g 2,4-bis-trimellitic imidotoluene, 120.5 g trimellitic imidocaproic acid and 3.59 g N-dodecyl trimellitic acid imide in 288 g N-methyl pyrrolidone, followed by stirring for 1 hour at 130° C. and then for 2 hours at 150° C., for 2 hours at 170° C. and for 2 hours at 190° C. A solution of the polyamide imide having a solids content of 40% by weight is obtained.

A sample of the polyamide imide solution is precipitated in methanol. A yellow powder having a glass temperature Tg of 197° C. and a relative viscosity $\eta^{25}$ of 1.60, as measured on a 1% solution in m-cresol, is obtained.

Another sample of the polyamide imide solution is diluted with dimethyl acetamide, coated onto a glass plate and stoved for 15 minutes at 200° C. and then for 15 minutes at 300° C. to form a clear, elastic paint film.

Another sample of the polyamide imide solution is concentrated in a stream of nitrogen at 250° and 310° C. The polymer is obtained in the form of a fusible, elastic resin having a relative viscosity $\eta^{25}$ of 1.85, as measured on a 1% solution in m-cresol.

EXAMPLE 7

54.6 g 4,4'-bis-trimellitic imidodiphenyl methane, 122.0 g trimellitic imidocaproic acid and 3.59 g N-dodecyl trimellitic acid imide are introduced into 290 g N-methyl pyrrolidone, followed by the dropwise addition over a period of 2 hours at 130° C. of a solution of 10.44 g of a technical mixture of 80% 2,4- and 20% 2,6-tolylene diisocyanate, 110.0 g 4,4'-diisocyanatodiphenyl methane and 1.19 g phenyl isocyanate in 90 g N-methyl pyrrolidone. The reaction mixture is then stirred for 1 hour at 130° C. and then for 2 hours at 150° C. and for 2 hours at 170° C. 12.8 g of a mixture of technical nonylphenols are then added, followed by stirring for another 2 hours 190° C. The polyamide imide is obtained in the form of a solution having a solids content of approximately 40% by weight and a relative viscosity $\eta^{25}$ of 1.50, as measured in N-methyl pyrrolidone.

A sample of the polyamide imide solution is concentrated by evaporation in a stream of nitrogen at 250° and 300° C. The polyamide imide is obtained in the form of a fusible and clear elastic resin having a relative viscosity $\eta^{25}$ of 1.76, as measured on a 1% solution in m-cresol.

EXAMPLE 8

54.6 g 4,4'-bis-trimellitic imidodiphenyl methane and 122 g trimellitic imidocaproic acid are introduced into 390 g caprolactam, followed by the introduction in portions over a period of 2 hours at 170° C. of 123.8 g 4,4'-diisocyanatodiphenyl methane and 2.11 g dodecyl isocyanate. The reaction mixture is then stirred for 1 hour at 170° C. and then for 2 hours at 190° C. and for 2 hours at 200° C. The reaction product solidifies on cooling to form a resin which is extracted with methanol.

The polyamide imide is obtained in the form of a yellow powder having a relative viscosity $\eta^{25}$ of 1.55, as measured on a 1% solution in m-cresol.

A sample of the polyamide imide powder is dissolved in a technical cresol mixture, coated onto a metal plate and stoved for 15 minutes at 200° C. and then for 15 at 300° C. to form a clear, elastic paint film.

Another sample of the polyamide imide powder is press-molded at 220° C./200 bar to form a transparent disk. The glass temperature Tg is 176° C.

EXAMPLE 9

672 g trimellitic anhydride and 437.5 g of 4,4'-diisocyanatodiphenylmethane are introduced into 3150 g of N-methylpyrrolidone. Then the mixture is stirred at 80°, 90° and 100° C. for in each case 2 hours. The condensation is carried out with the elimination of carbon dioxide. Then 1313 g of trimellitimidoundecanoic are introduced, after which a solution of 1313 g of 4,4'-diisocyanatodiphenylmethane in 1400 g of N-methylpyrrolidone is added dropwise at 130° C. in the course of 4 hours. Then the mixture is stirred for a further hour at 130° C., 16.66 g of phenylisocyanate in 100 g of N-methylpyrrolidone are added dropwise and the mixture is stirred once again at this temperature. Then the condensation is completed at 150° C., 170° C. and 190° C. for in each case 2 hours. The reaction mixture is diluted with 1060 g of N-methylpyrrolidone. The polyamide-imide is obtained in the form of a brown viscous solution with a solids content of 35% by weight and a relative viscosity $\eta^{25}$ of 1.57, measured on a 1% solution in N-methylpyrrolidone at 25° C.

A sample of the polyamide-imide solution thus prepared is evaporated in a stream of nitrogen at 250° and 300° C. for in each case one hour. The polyamide-imide is obtained in the form of a clear elastic resin with a relative viscosity $\eta^{25}$ of 1.93, measured on 1% solution in m-cresol, and a glass transition temperature Tg of 190° C.

The polyamide-imide is precipitated from a sample of the solution prepared according to the example by diluting the solution with N-methylpyrrolidone to a solids content of 20% by weight, adding 25 g of methanol per 100 g of this solution and then adding the solution dropwise to methanol. The product of precipitation is ground with methanol and extracted once again. The polyamide-imide is obtained in the form of a pale yellow powder with a relative viscosity $\eta^{25}$ of 1.82, measured on a 1% solution in m-cresol.

EXAMPLE 10

1229 g of trimellitic anhydride and 880 g of 4,4'-diisocyanatodiphenylmethane are introduced into 3600 g of N-methylpyrrolidone. Then the mixture is stirred at 80°, 90° and 100° C. for in each case 2 hours. Then 488 g of trimellitimidocaproic acid are introduced, after which a solution of 1140 g of 4,4'-diisocyanatodiphenylmethane in 880 g of N-methylpyrrolidone is added dropwise at 130° C. in the course of 4 hours. Then the mixture is stirred at 130° and 150° C. for in each case one hour, after which a solution of 19 g of phenyl isocyanate in 96 g of N-methylpyrrolidone is added dropwise. Then, while passing over nitrogen, the mixture is stirred at 150° C. for a further hour and at 170° and 190° C. for in each case 2 hours. Then 1120 g of N-methylpyrrolidone are introduced into the reaction mixture. The polyamide-imide is obtained in the form of a viscous solution with a solids content of 35% by weight and a relative viscosity $\eta^{25}$ of 1.79, measured on a 1% solution in N-methylpyrrolidone.

A sample of this solution is diluted with N-methylpyrrolidone to a solids content of 20% by weight, stirred with 25 g of methanol per 100 g of solution and added dropwise to methanol. The precipitated product is ground, extracted and dried. The polyamide-imide is obtained in the form of a yellow powder with a glass transition temperature Tg of 247° C. and a relative viscosity $\eta^{25}$ of 1.94, measured on a 1% solution in m-cresol.

We claim:
1. A process for the production of polyamide imides, characterized in that organic diisocyanates are reacted with 95 to 5 mol-% of an imidocarboxylic acid corresponding to formula (I)

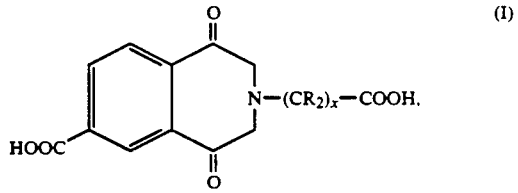

in which
the R's independently of one another represent hydrogen (H), $C_{1-6}$ alkyl,
x is the number 1, 2, 3, 4, 5, 6, 7, 8, 9, 10, 11 or 12 and
5 to 95 mol-% of a diimidodicarboxylic acid corresponding to formula (II)

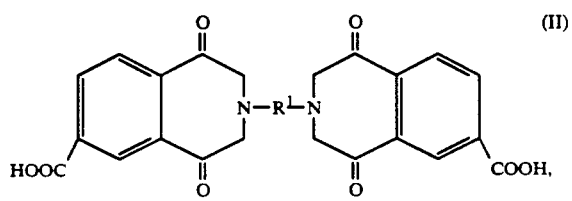

in which
$R^1$ is an aliphatic, aliphatic-aromatic or aromatic radical, at temperatures in the range from 50° to 400° C. and preferably at temperatures in the range from 70° to 350° C. optionally in a solvent and optionally in the presence of a catalyst.

2. A process as claimed in claim 1, characterized in that the stoichiometric quantities of trimellitic anhydride and a diisocyanate corresponding to formula (IV)

$$OCN-R^1-NCO \qquad (IV)$$

in which
$R^1$ is as defined in claim 1, is used instead of the diimidodicarboxylic acid (II).

3. A process as claimed in claim 1, characterized in that the imidocarboxylic acids (I) and (II) are initially introduced in a solvent and the diisocyanate is introduced in portions over a period of 1 to 10 hours at 80° to 200° C.

4. Process according to claim 2, characterized in that one val of acid anhydride is reacted with one val of isocyanate at temperatures of 60° to 140° C., optionally in a solvent and optionally in the presence of a catalyst, after which the trimellitimidocarboxylic acid I is added and the remaining quantity of diisocyanate is added in portions in the course of 1 to 10 hours at temperatures of 80° to 200° C.

5. A process as claimed in claim 1, characterized in that, in formula (I) for the imidocarboxylic acids, x is the number 5, 10 or 11.

6. A process as claimed in claim 1, characterized in that, in formula (II) for the diimidodicarboxylic acids, $R^1$ represents the disubstituted radicals of 4,4'- and 2,4'-diphenyl methane and 2,4- and 2,6-toluene and mixtures thereof and 1,6-disubstituted hexane.

7. A process as claimed in claim 1, characterized in that 4,4'- and 2,4'-diisocyanatodiphenyl methane, 2,4- and 2,6-tolylene diisocyanate and mixtures thereof are used as the diisocyanates.

8. A process as claimed in claim 1, characterized in that the polyamide imide is produced in a solvent and is optionally concentrated even at this stage to a still free-flowing solution and the concentration process is completed, optionally with post-condensation, in an evaporation extruder at temperatures in the range from 240° to 400° C.

9. A process as claimed in claim 1, characterized in that the polyamide imide is produced in a solvent, concentrated by precipitation or extraction and optionally postcondensed in an extruder or in the solid phase.

10. Polyamide imide produced by the process of claim 1.

11. Polyamide imide produced by the process of claim 2.

* * * * *